United States Patent
Hugi et al.

(10) Patent No.: US 12,336,458 B2
(45) Date of Patent: Jun. 24, 2025

(54) BALER TWINE AND METHOD FOR TWINING BALES

(71) Applicant: TAMA GROUP, Kibbutz Mishmar Haemek (IL)

(72) Inventors: Reuven Hugi, Nahariya (IL); Adi Moked Malachi, Kibbutz Galed (IL); Maya Rabinovitch, Pardes Hanna-Karkur (IL)

(73) Assignee: TAMA GROUP, Kibbutz Mishmar Haemek (IL)

( * ) Notice: Subject to any disclaimer, the term of this patent is extended or adjusted under 35 U.S.C. 154(b) by 304 days.

(21) Appl. No.: 17/916,578

(22) PCT Filed: Mar. 15, 2022

(86) PCT No.: PCT/IL2022/050295
§ 371 (c)(1),
(2) Date: Oct. 2, 2022

(87) PCT Pub. No.: WO2022/195590
PCT Pub. Date: Sep. 22, 2022

(65) Prior Publication Data
US 2023/0148479 A1    May 18, 2023

Related U.S. Application Data

(60) Provisional application No. 63/270,425, filed on Oct. 21, 2021, provisional application No. 63/160,975, filed on Mar. 15, 2021.

(51) Int. Cl.
*A01F 15/14*   (2006.01)
*C08L 23/12*   (2006.01)
(Continued)

(52) U.S. Cl.
CPC ............ *A01F 15/141* (2013.01); *C08L 23/12* (2013.01); *D02G 3/045* (2013.01); *D02G 3/44* (2013.01);
(Continued)

(58) Field of Classification Search
CPC ........ A01F 15/14; A01F 15/141; B65B 13/20; B65B 13/26; C08L 23/06; C08L 23/12;
(Continued)

(56) References Cited

U.S. PATENT DOCUMENTS 3,705,123 A    12/1972   Mahlman et al.
4,739,025 A    4/1988    Burch
(Continued)

FOREIGN PATENT DOCUMENTS

CN    1147572 A    4/1997
GB    1057077 A    2/1967

OTHER PUBLICATIONS

Joshi et al., "Studies on composite filaments from nanoclay reinforced polypropylene." Fibers Polym 5, 59-67 (2004), https://doi.org/10.1007/BF02875496.
(Continued)

*Primary Examiner* — Jimmy T Nguyen
(74) *Attorney, Agent, or Firm* — The Roy Gross Law Firm, LLC; Roy D. Gross (57) ABSTRACT

The twine comprises-includes a mixture of at least 95 wt. % polypropylene and at most 5 wt. % additives. The twine is characterized by up to 8% vol. smectic phase. The percentage of the smectic phase is characterized using X-Ray Diffractometry (XRD). The additives are selected from, impact modifier, polyethylene, pigment, and UV stabilizer. The twine is characterized by a ratio between a specific work to a relative stiffness, of between 40 to 55 [J*mm/KgF].

9 Claims, 7 Drawing Sheets

(51) Int. Cl.
*D02G 3/04* (2006.01)
*D02G 3/44* (2006.01)

(52) U.S. Cl.
CPC .... *C08L 2203/12* (2013.01); *D10B 2321/022* (2013.01)

(58) Field of Classification Search
CPC ...... C08L 2203/12; D02G 3/045; D02G 3/44; D10B 2321/022; C08K 3/013; B29C 48/00; B29C 55/06; B29C 48/022
See application file for complete search history.

(56) References Cited

U.S. PATENT DOCUMENTS 5,585,054 A * 12/1996 Evans ................. C08J 5/10
264/211
5,948,334 A 9/1999 Takeuchi et al.

OTHER PUBLICATIONS

PCT International Search Report for International Application No. PCT/IL2022/050295, mailed Jun. 15, 2022, 3pp.
PCT Written Opinion for International Application No. PCT/IL2022/050295, mailed Jun. 15, 2022, 3pp.
PCT International Preliminary Report on Patentability for International Application No. PCT/IL2022/050295, issued Sep. 12, 2023, 4pp.

* cited by examiner

| Name | A | B | C | D | E |
|---|---|---|---|---|---|
| Crystallinity (1) | 0.58 | 0.62 | 0.61 | 0.65 | 0.65 |
| Amorphous | 0.42 | 0.38 | 0.39 | 0.35 | 0.35 |
| Absolute Or-Am | 0.176 | 0.163 | 0.125 | 0.13 | 0.144 |
| Un-Or-amorph | 0.088 | 0.122 | 0.195 | 0.116 | 0.133 |
| Absolute Smect | 0.155 | 0.095 | (0.07) | 0.105 | (0.074) |
| K-or-amorph (2) | 0.42 | 0.4 | 0.39 | 0.38 | 0.35 |
| K-or-crystals (5) | 0.972 | 0.969 | 0.975 | 0.981 | 0.979 |
| Or-amorph part (3) | 0.42 | 0.43 | 0.32 | 0.37 | 0.41 |
| Smect/total-amorph (4) | 0.37 | 0.25 | (0.18) | 0.3 | (0.21) |
| Smect/Cr | 0.268 | 0.153 | 0.115 | 0.162 | 0.113 |

FIG. 2

| Sample | Band | F | Fc |
|---|---|---|---|
| 02 | Band at 998 cm⁻¹ | | 0.96 ± 0.03 |
| | Band at 972 cm⁻¹ | 0.64 ± 0.03 | |
| 11 | Band at 998 cm⁻¹ | | 0.88 ± 0.05 |
| | Band at 972 cm⁻¹ | 0.50 ± 0.06 | |

FIG. 3A

| Sample | Band | F | Fc |
|---|---|---|---|
| 20 | Band at 998 cm⁻¹ | | 0.79 ± 0.17 |
| | Band at 972 cm⁻¹ | 0.61 ± 0.03 | |
| 22 | Band at 998 cm⁻¹ | | 0.96 ± 0.03 |
| | Band at 972 cm⁻¹ | 0.61 ± 0.03 | |

FIG. 3B

| | | Average Real Runnage (m/kg) | Average Weight of running meter (g) | Average Tensile strength (kgf) | Average Specific Strength (gr/denier) | Average Linear elongation at max (cm) for 25 cm twine |
|---|---|---|---|---|---|---|
| A | A1 | 128 | 7.80 | 171.90 | 2.45 | 5.26 |
|   | A2 | 140 | 7.16 | 165.45 | 2.57 | 4.85 |
|   | A3 | 136 | 7.36 | 198.25 | 2.99 | 5.20 |
|   | A4 | 129 | 7.73 | 202.79 | 2.91 | 5.88 |
| B | B1 | 140 | 7.15 | 158.45 | 2.46 | 7.75 |
|   | B2 | 142 | 7.03 | 166.92 | 2.64 | 7.84 |
|   | B3 | 133 | 7.53 | 175.54 | 2.59 | 7.98 |
|   | B4 | 121 | 8.26 | 197.35 | 2.65 | 7.6 |
|   | B5 | 120 | 8.34 | 197.85 | 2.64 | 7.91 |
|   | B7 | 100 | 9.99 | 250.97 | 2.79 | 7.91 |
| C | C1 | 129 | 7.75 | 205.03 | 2.94 | 5.97 |
|   | C2 | 137 | 7.32 | 191.13 | 2.90 | 7.07 |
|   | C3 | 141 | 7.11 | 154.14 | 2.41 | 11.73 |
|   | C4 | 110 | 9.09 | 236.46 | 2.89 | 6.77 |
|   | C5 | 72 | 13.81 | 303.22 | 2.44 | 7.28 |

FIG. 4

| Sample | Average of Work to maximum load (J) | Specific work [J*m/gr] | Average of Relative Stiffness [kgF*m/mm*gr] | Average of Linear elongation at max (cm) | Specific work/relative stiffness |
|---|---|---|---|---|---|
| A1 | 48.11 | 6.17 | 0.42 | 5.26 | 14.60 |
| A2 | 68.61 | 7.70 | 0.50 | 5.24 | 15.40 |
| A3 | 39.89 | 5.57 | 0.48 | 4.85 | 11.54 |
| A4 | 57.74 | 7.84 | 0.52 | 5.20 | 15.01 |
| A5 | 62.62 | 8.10 | 0.45 | 5.88 | 18.12 |
| B1 | 73.28 | 10.44 | 0.24 | 9.00 | 42.65 |
| B2 | 79.97 | 11.39 | 0.26 | 8.94 | 44.10 |
| B3 | 103.30 | 13.18 | 0.25 | 10.02 | 52.70 |
| B4 | 122.91 | 12.66 | 0.25 | 9.42 | 50.63 |
| B5 | 80.66 | 11.52 | 0.26 | 8.84 | 43.70 |
| B6 | 74.01 | 11.13 | 0.27 | 8.77 | 41.22 |
| B7 | 86.53 | 12.02 | 0.25 | 9.46 | 48.07 |
| C1 | 62.33 | 8.04 | 0.46 | 5.97 | 17.48 |
| C2 | 69.52 | 9.50 | 0.37 | 7.07 | 25.60 |
| C3 | 100.65 | 14.16 | 0.19 | 11.73 | 76.24 |
| C4 | 84.39 | 13.42 | 0.22 | 10.50 | 61.02 |
| C5 | 88.86 | 9.19 | 0.38 | 6.82 | 34.97 |
| C6 | 59.61 | 7.12 | 0.52 | 5.00 | 24.34 |
| C7 | 89.95 | 9.58 | 0.37 | 6.98 | 31.41 |
| C8 | 75.22 | 7.79 | 0.36 | 6.42 | 31.26 |
| C9 | 75.09 | 11.19 | 0.30 | 8.30 | 37.70 |
| C10 | 80.65 | 11.42 | 0.20 | 10.05 | 58.34 |
| C11 | 79.63 | 12.54 | 0.22 | 10.19 | 56.88 |
| C12 | 69.19 | 9.68 | 0.29 | 7.75 | 33.71 |
| C13 | 67.19 | 9.56 | 0.30 | 7.84 | 31.50 |
| C14 | 71.52 | 11.21 | 0.29 | 8.52 | 38.56 |

BALER TWINE AND METHOD FOR TWINING BALES

CROSS-REFERENCE TO RELATED APPLICATIONS

This application is a National Phase of PCT Patent Application No. PCT/IL2022/050295 having International filing date of Mar. 15, 2022, which claims the benefit of priority of U.S. provisional patent application Nos. 63/160,975 filed Mar. 15, 2021 and 63/270,425 filed Oct. 21, 2021, all entitled "BALER TWINE AND METHOD FOR TWINING BALES," the contents of which are all incorporated herein by reference in their entirety.

The present invention relates generally to twines. More specifically, the present invention relates to a baler twine and method for twining bales.

BACKGROUND

Baler twine can be a synthetic twine used for binding fibrous material (e.g., hay or straw) into a more compact and easily stacked form, also known as, a bale. Most of the synthetic twines are made of polypropylene. Baler twines require having high knot strength, high twine to twine friction coefficient to allow forming high strength knots, and low twine/fibrous material friction coefficient to allow easy sliding of the twine over the fibrous material. Therefore, the twines need to have flexibility and environmental durability. The diameter and dimensions of the twine are selected to allow the use of the twine in commerical balers. (e.g., typical twine diameters are between 3.5 mm to 5.5 mm). Commercial twines are measured in runnage (e.g., meter per kg.) which vary between 400-75. Typical twines have specific strength of e.g., 5 gr./denier.

The aim of the present invention is to provide a polypropylene-based twine, having an improved performance compared to known polyproylene-based twines having of the same measures/size such as diameter, or the known commercial on-field performance for smaller twine diameter.

SUMMARY

Some aspects of the invention may be directed to a twine, comprising: a mixture of at least 95 wt. % polypropylene and up to 5 wt % additives. In some embodiments, the twine is characterized by up to 8% vol. smetic phase. In some embodiments, the percentage of the smectic phase is measured using X-Ray Diffractometry (XRD). In some embodiments, the additives are selected from: impact modifier, polyethylene, pigment, and UV stabilizer. In some embodiments, the twine is characterized by a ratio between specific work to relative stiffness, of between 40 to 55 [J*mm/KgF].

Some aspects of the invention may be directed to a twine, comprising: a mixture of at least 95 wt. % polypropylene and up to 5 wt. % additives. In some embodiments, a crystalline phase of the twine is characterized by a degree of orientation of at most 0.9. In some embodiments, the degree of orientation may be measured by polarized Fourier transform infrared spectroscopy. In some embodiments, the additives are selected from, impact modifier, polyethylene, pigment, and UV stabilizer. In some embodiments, the twine is characterized by a ratio between a specific work to a relative stiffness, of between 40 to 55 [J*mm/KgF].

Some aspects of the invention may be directed to a twine comprising: a mixture of at least 95 wt. % polypropylene and at most 5 wt. % additives. In some embodiments, the twine is characterized by a ratio between a specific work to a relative stiffness, of between 40 to 55 [J*mm/KgF].

Some aspects of the invention may be directed to a bale twining with a twine according to any embodiment of the invention.

Some aspects of the invention may be directed to a method for entwining bales, comprising twining a fibrous material using twine to form a bale, wherein the twine comprises: a mixture of polypropylene and at most 5 wt. % additives. In some embodiments, the microstructure of the twine may include at most 8 vol. smectic phase and/or may have a degree of orientation of at most 0.9 of the crystalline phase. In some embodiments, the method may further include providing a spool of the twine to a baler. In some embodiments, the method may further include inserting the fibrous material into the baler.

Some aspects of the invention may be directed to a method for entwining bales, comprising twining a fibrous material using twine to form a bale, wherein the twine comprises: a mixture of at least 95 wt. % polypropylene and at most 5 wt. % additives. In some embodiments, the twine is characterized by a ratio of specific work to relative stiffness, of between 40 to 55 [J*mm/KgF].

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings. Embodiments of the invention are illustrated by way of example and not limitation in the figures of the accompanying drawings, in which like reference numerals indicate corresponding, analogous or similar elements, and in which:

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of the same or similar features or elements may not be repeated.

Aspects of the invention may be related to twine for the use in balers for forming bales from fibrous materials. A twine according to embodiments of the invention may have improved performance in the field. For example, twines according to embodiments of the invention may be more stable and have less tendency to cause the dismantle/brake/failure of a bale in comparison to commercial twines. For example, 5% of bales twined by commercial twines are expected to fail/disintegrate in comparison to less than 1.5% of bales twined by twines in accordance to embodiments of the invention. As used herein a failure of a bale is defined as tearing/deforming/braking of at least two twines in a bale that causes disassembling of the bale or a dimensional distortion of at least 8% (e.g., in at least 20 cm) in at least one dimension of the bale.

Figure 1A:
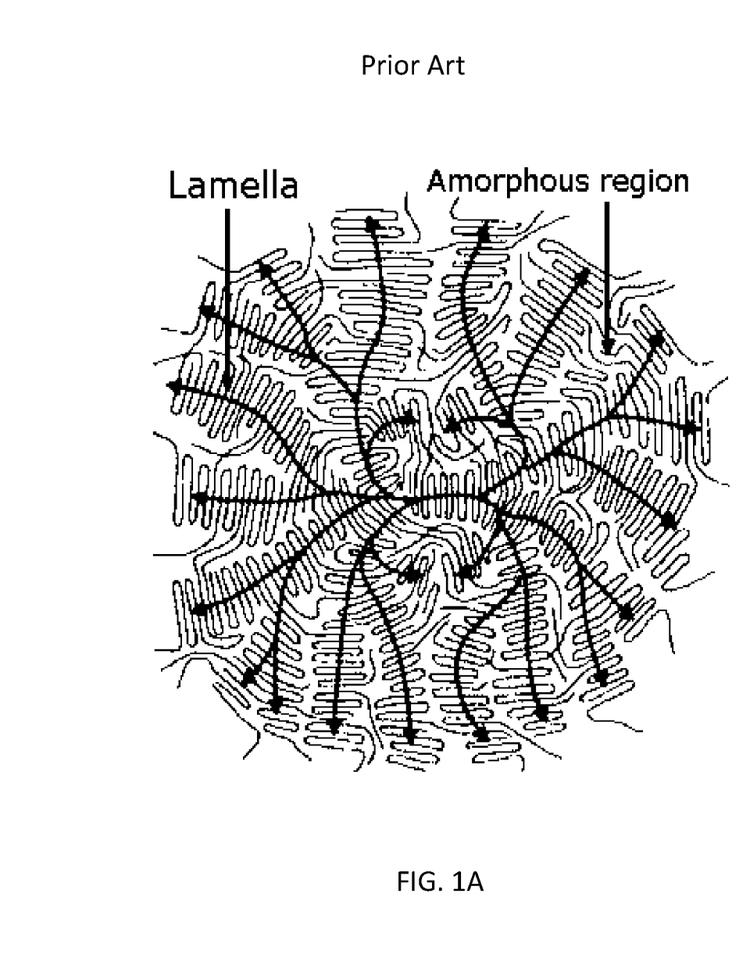
FIG. 1A is a schematic illustration of a microstructure of a semicrystalline polymer.
Figure 1B:
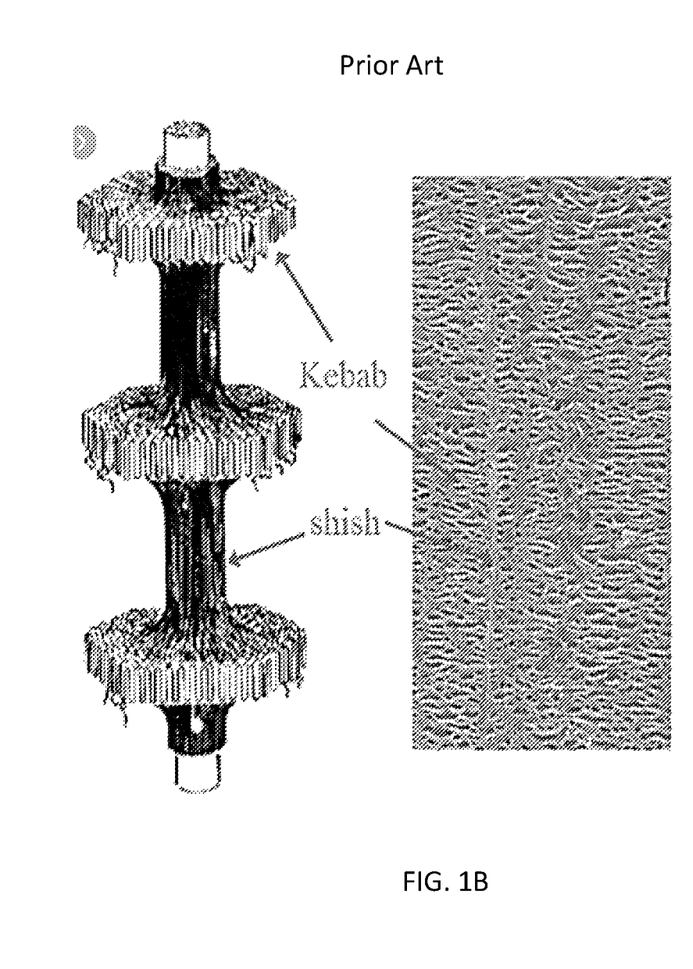
FIG. 1B is a schematic illustration of a microstructure of a crystalline polymer after the extrusion process.

The microstructure of semicrystalline linear polymer, such as, polypropylene is schematically illustrated in FIG. 1A. The microstructure of a linear polymer after the extrusion process is shown in 1B. During the extrusion process chains of a linear polymer are rearranged to form a more compacted and ordered structure. The orientation of the chains may be in the machine direction (MD). The microstructure of extruded linear polymers, as illustrated in FIG. 1B, includes a combination of two crystallographic structures known as "shish-kebab". The "shish" structure includes a highly oriented fibrous arrangement of the chains, wrapped with the "kebab" structure with includes a lamellar structure. Semicrystalline polymers include 2 phases, a highly oriented (ordered) phase in the form of lamellas embedded in an amorphous phase. In between the crystalline phase and the amorphous phase may lay a third intermediate phase, also known in the art as a smectic phase. In some cases, the amount of the intermediate smectic phase may be affected by additional treatments/additives.

As used herein, a smectic phase may be defined as a phase having short-range orientation. In a smectic phase, the molecules maintain the general orientational order, but also tend to align in layers or planes. Motion is restricted to within these planes, and separate planes are observed to flow past each other. The increased order means that the smectic state is more "crystalline—like".

The inventors surprisingly found that the amount of a smectic phase in the final twine has a crucial impact on the performance of the twine (such as when packing a bale). Additional property that was found to affect the performance of the final twine is the degree of orientation, of the polymeric chains.

A degree of orientation of extruded polymers can be measured by Polarized Fast Furrier Transform infrared (FTIR) spectrometer. The degree of orientation is calculated based on the IR radiation absorbance in the machine direction (MD) and the transverse direction (TD).

In some embodiments, the limited smectic phase and/or a decreased degree of orientation caused a decrease in the tensile strength and the specific strength of the twines. This result is considered in the art as undesired. As known in the art, high tensile strength is associated with specific strength of the twine, and therefore the twine is expected to perform better. However, the inventors surprisingly found, that reducing in the tensile strength and the specific strength (as disclosed and discussed with respect to FIG. 4) resulted: in enhanced performance or in dramatically improved performance of the twines when twining a bale. In some embodiments, the reduction in tensile strength and specific strength were accompanied by an increase in the linear elongation of the twine, which in turn resulted in improved performance. For example, the inventors found that twines having a linear elongation of 28-36% were expected to result in less (about 20%) failure of bales in comparison to commercial twines having smaller elongation, or twines having larger elongation.

A twine according to some embodiments of the invention, comprises at least 90 wt. % polypropylene, at least 91 wt. % polypropylene, at least 92 wt. % polypropylene, at least 93 wt. % polypropylene, at least 94 wt. % polypropylene, at least 95 wt. % polypropylene, at least 96 wt. % polypropylene, at least 97 wt. % polypropylene at least 98 wt. % polypropylene, at least 99 wt. % polypropylene, or any range therebetween. A twine according to some embodiments of the invention, may include a mixture of at least 90 wt. % polypropylene and at most: 10 wt. % additives. In some embodiments, a twine according to some embodiments of the invention may include a mixture of at least 91 wt. % polypropylene and at most 9 wt. % additives. In some embodiments, a twine according to some embodiments of the invention may include a mixture of at least 92 wt. % polypropylene and at most 8 wt. % additives. In some embodiments, a twine according to some embodiments of the invention may include a mixture of at least 93 wt. % polypropylene and at most 7 wt. % additives. In some embodiments, a twine according to some embodiments of the invention may include a mixture of at least 94 wt. % polypropylene and at most 6 wt. % additives. In some embodiments, a twine according to some embodiments of the invention may include a mixture of at least 95 wt. % polypropylene and at most 5 wt. % additives. In some embodiments, a twine according to some embodiments of the invention may include a mixture of at least 96 wt. % polypropylene and at most 4 wt. % additives. In some embodiments, a twine according to some embodiments of the invention may include a mixture of at least 97 wt. % polypropylene and at most 3 wt. % additives.

In some embodiments, one or more additives may be selected from, polyethylene (e.g., up to 2 wt. %), pigment (e.g., up to 2 wt. %), UV stabilizer (e.g., up to 0.5 wt. %, for example, 0.1 wt. % synergistic mixture of oligomeric hindered amine light stabilizes) and the like. In some embodiments, the additive may include an impact modifier.

In some embodiments, the twine is be characterized by up to 8 vol. % smectic phase, for example, between 1 vol. % to 8 vol. %, 0.5 vol. % to 8 vol. %, 0.5 vol. % to 6 vol. %, or 1 vol. % to 6 vol. %. In some embodiments, the percentage of the smectic phase is measured using X-ray Diffractometry (XRD). Some experimental XRD results showing the difference in the percentage of smectic phase in commercial twines in comparison to twines according to embodiments of the invention are given and discussed with respect to the table of FIG. 2.

In some embodiments, a crystalline phase of the twine is characterized by a degree of orientation of at most 0.9 measured using, for example, Polarized FTIR. In some embodiments, the degree of orientation is between 0.9 to 0.8, between 0.9 to 0.7, between 0.9 to 0.6, or between 0.9 to 0.5. As should be understood by one skilled in the art, the degree of orientation may be measured using other methods. Some experimental polarized FTIR results showing the difference in the orientation of the crystalline phase in commercial twines in comparison to twines according to embodiments of the invention are given and discussed with respect to the tables of FIGS. 3A and 3B.

The twine, according to embodiments of the invention, may have runnage (meter/kg) of 400-75, for example, 400-200, 170-75 and the like.

In some embodiments, the twine may be characterized by a ratio between specific work to relative stiffness. Accordingly, the ratio according to embodiments of the invention is between 40 to 55 [J*mm/KgF]. Accordingly, the ratio according to embodiments of the invention is between 45 to 55 [J*mm/KgF]. Accordingly, the ratio according to embodiments of the invention is between 30 to 45 [J*mm/KgF]. Accordingly, the ratio according to embodiments of the invention is between 35 to 50 [J*mm/KgF]. The specific work at knot=average work at maximum load [J]/average of the runnage [gr/mm]. The relative stiffness is measured in [KgF*m/mm*gr].

In some embodiments, the ratio according to embodiments of the invention is between 39 to 55[J*mm/KgF]. In some embodiments, the ratio according to embodiments of the invention is between 40 to 56[J*mm/KgF]. In some embodiments, the ratio according to embodiments of the invention is between 41 to 55 [J*mm/KgF]. In some embodiments, the ratio according to embodiments of the invention is between 41 to 53 [J*mm/KgF]. Experimental results comparing commercial twines and twines according to embodiments of the invention are given and discussed with respect to the table of FIG. 5. These ranges of the ratio may be used as an indicator for the ability of the twine to absorb impact energy while sustaining a required strength for twining a bale.

Some aspect of the invention may be directed to a bale being twined with a twine according to any embodiment of the invention. Such a twine may be packed in a spool ready to be loaded into a baler for twining bales.

A twine according to some embodiments of the invention may be extruded using any known method. In some embodiments, in order to form the required specific microstructure, thermal treatment can be applied and/or impact additives may be added.

In a nonlimiting example, polypropylene was mixed with impact modifier additives (for example, between 0.5 to 2.5 wt. % ethylene-based-olefin elastomer) and extruded in an extruder to form the twine. The twine rolls were then heated for 4-8 h at a temperature of 130-160° C.

Figure 1C:
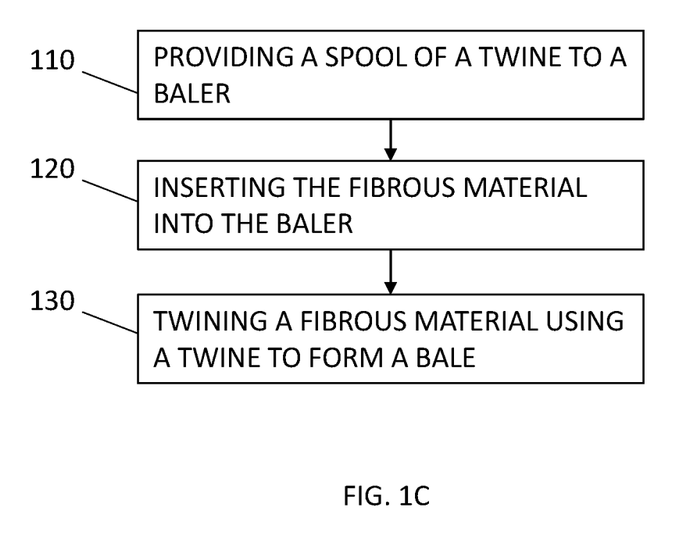
FIG. 1C is a flowchart of a method of twining bales according to some embodiments of the invention.

Reference is now made to FIG. 1C which is a flowchart of a method of twining bales according to some embodiments of the invention. The method of FIG. 1C may be performed using any twine according to any embodiment of the invention, for example, a twine that includes a mixture of at least 90 wt. % polypropylene and at most 10 wt. % additives (e.g., at most 5 wt. %, 6 wt. %, 7 wt. %, 8 wt. %, 9 wt. %, or any range therebetween). In some embodiments, the twine is characterized by up to 8 vol. % smectic phase and/or a crystalline phase of said twine is characterized by a degree of orientation of at most 0.9, 0.8, 0.7, 0.6, or 0.5 measured using polarized FTIR. In some embodiments, the twine may be used for twining a fibrous material to form a bale.

Figure 6:
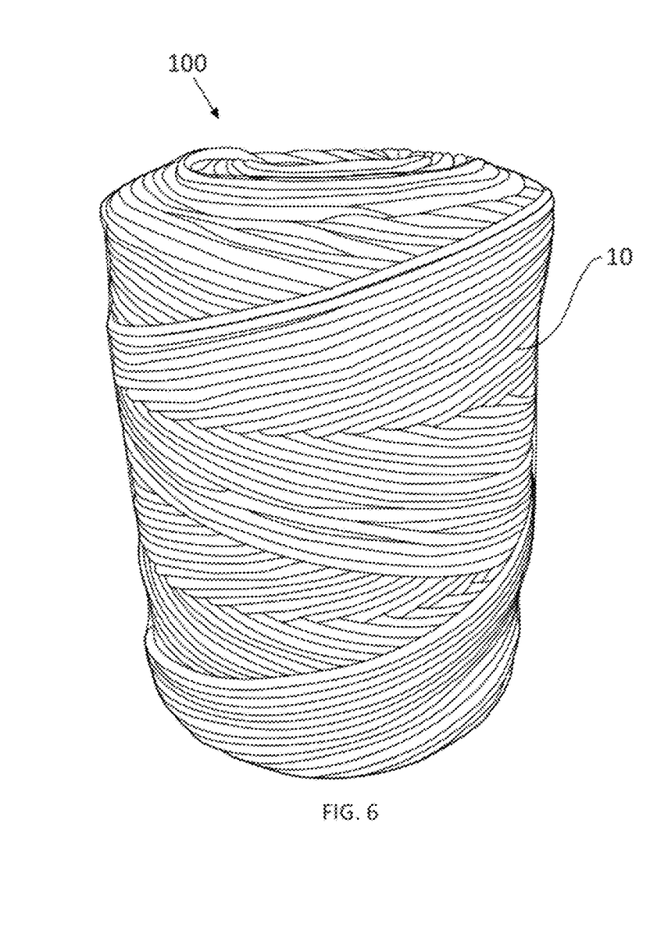
FIG. 6 is an illustration of a spool of a twine according to some embodiments of the invention.
Figure 7:
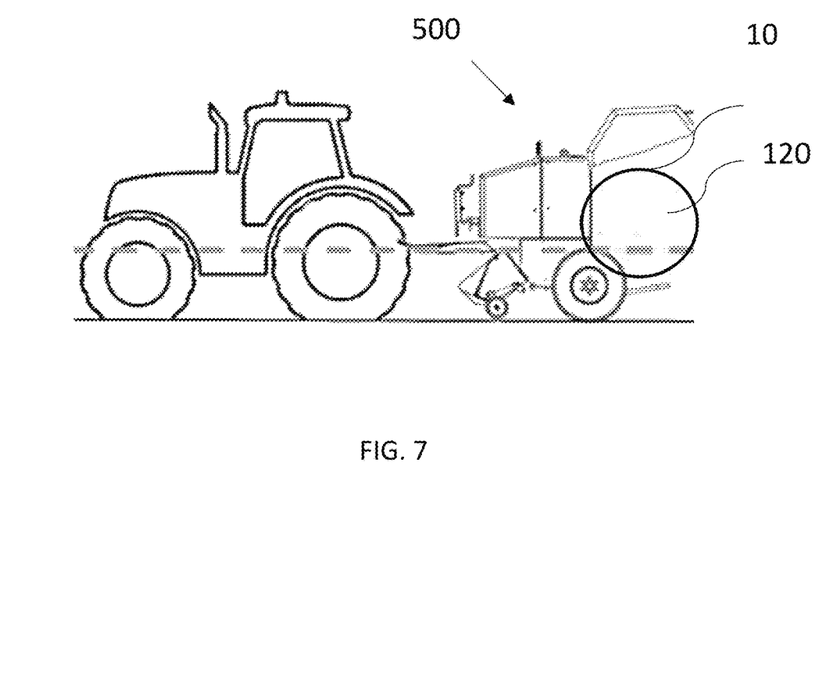
FIG. 7 is an illustration of a baler according to some embodiments of the invention.

In step 110, a spool 100 of a twine 10 illustrated in FIG. 6, may be provided to a baler 500 illustrated in FIG. 7. In step 120, the fibrous material may be inserted into baler 500. For example, hey may be collected by the baler, as the baler progress in the field. In step 130, the baler may use twine 10 to pack/twine the fibrous material into bales 120.

Experimental Results

A twine material, according to embodiments of the invention, was made using extrusion and thermal treatment. The twin material included polypropylene and up to 2.5% additives. The final unique microstructure and mechanical properties were tested using various testing methods.

Figure 2:
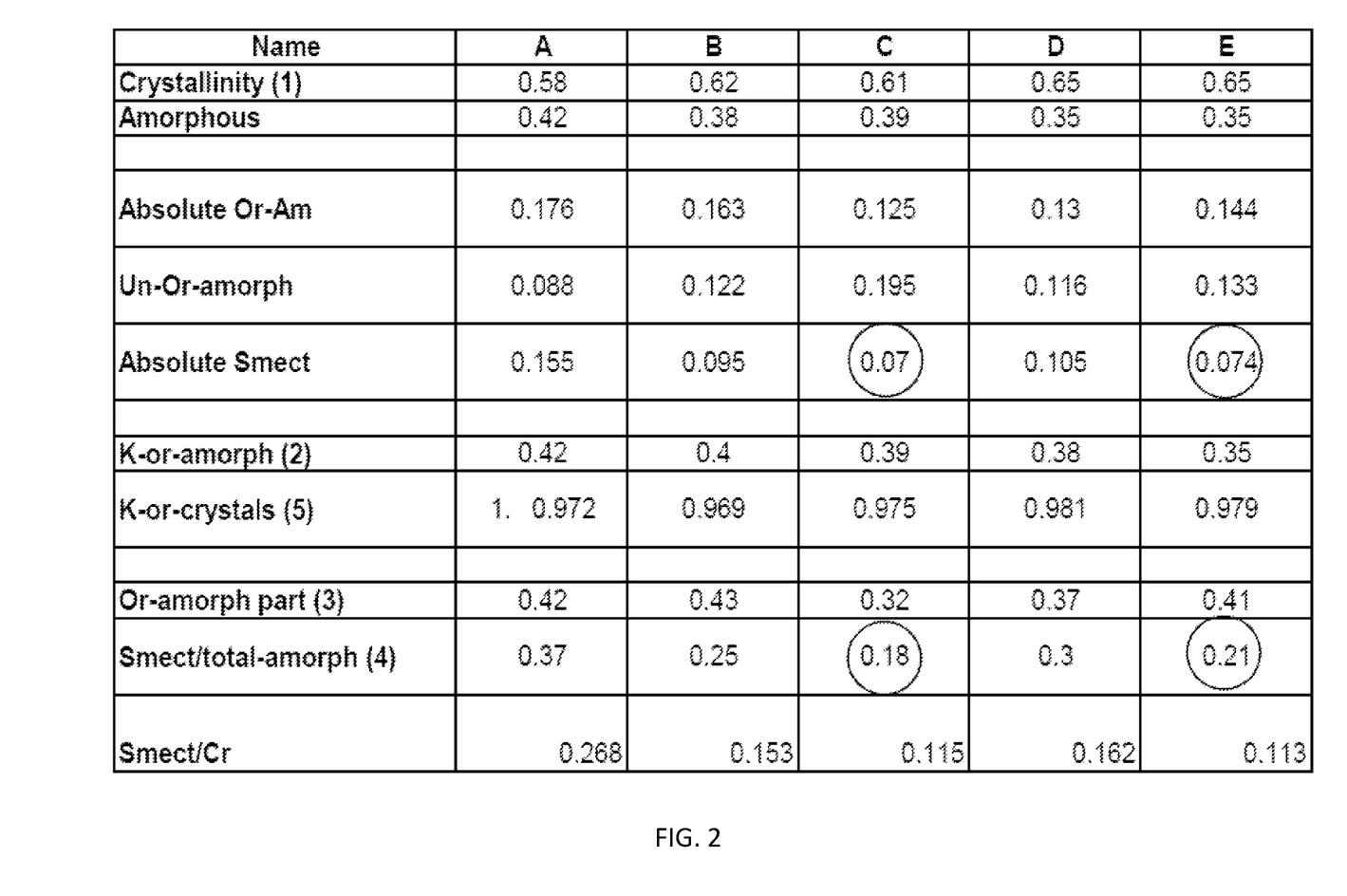
FIG. 2 is a table summarizing the volume percentage of microstructure morphologies, of commercial twines in comparison to twines according to embodiments of the invention, analyzed using X-Ray diffractometry (XRD)

Reference is now made to FIG. 2 which is a table summarizing the volume percentage of microstructure morphologies of commercial twins in comparison to twines according to embodiments of the invention, analyzed using XRD. Twines A, B, and D are commercial twines having substantially the same chemical composition as twines C and E which are twines according to embodiments of the invention. As can be clearly shown in the table, the most significant difference in the microstructures is the relatively low amount of smectic phase, up to 7.4 vol. %, found in twines C and E in comparison to the commercial twines which had more than 9.5 vol. % smectic phase.

Figure 3A:
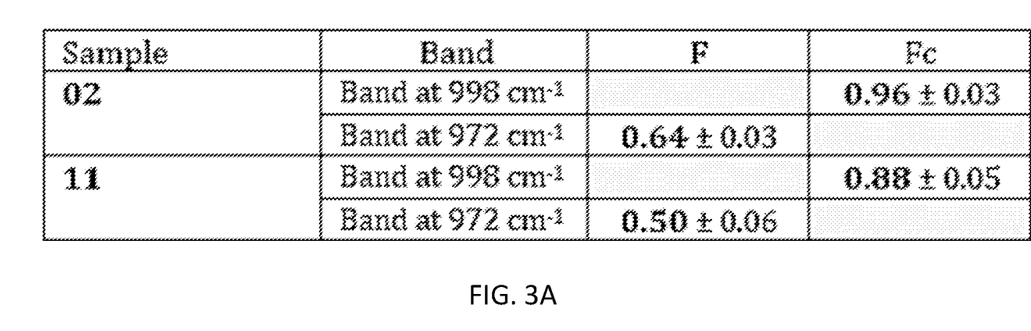
FIGS. 3A and 3B are tables showing an orientation level in commercial twins in comparison to twines according to embodiments of the invention, analyzed by polarized Fourier transform infrared spectroscopy (FTIR)
Figure 3B:
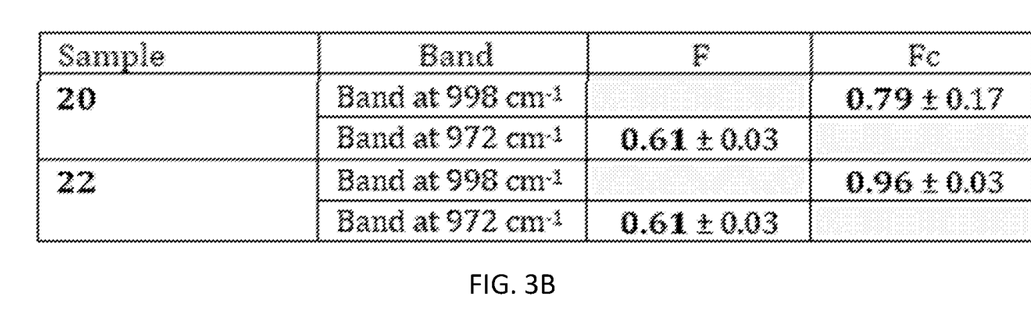

Reference is now made to FIGS. 3A and 3B which are tables showing an orientation degree of commercial twins in comparison to twines according to embodiments of the invention, analyzed by polarized FTIR. Samples 02 and 22 were taken from commercial twines, while samples 11 and 20 were taken from twines according to embodiments of the invention. All the samples have substantially the same chemical composition. As can be clearly shown in the tables, the degree of orientation of the crystalline phase (Fc) in the commercial twines is higher than the degree of orientation in the twines according to embodiments of the invention, which was lower than 0.9, for example, 0.88 and 0.79.

Figure 4:
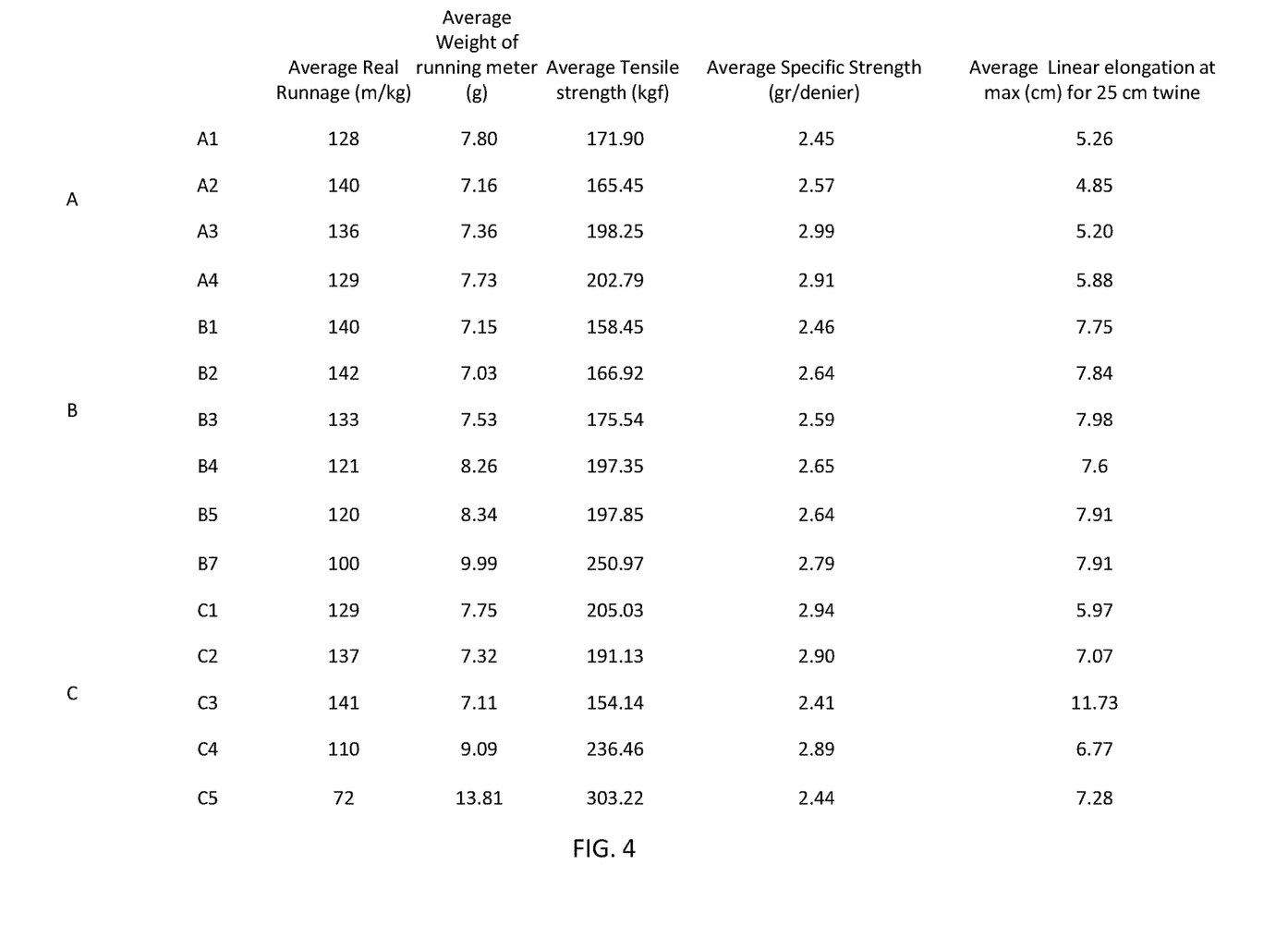
FIG. 4 is a table summarizing mechanical properties of commercial twins in comparison to twines according to embodiments of the invention.

The discussed microstructure may have an impact on the mechanical properties and the mechanical behavior of the twines, as shown in the table of FIG. 4. The table of FIG. 4 shows experimental results of drum tests conducted according to ISO 4187:2006[E].

Three groups of twines were tested, groups A and C include commercial twines and group B includes twines according to some embodiments of the invention. All the twines were made from polypropylene with/without additives. The average real runnage (m/kg) and the average weight of the running meter (g) of each twine are given in the two left columns. The mechanical properties tested were the average tensile strength (KgF), average specific strength (gr/denier), the average relative stiffness, and the average linear elongation at maximum load (cm).

As shown in the table the average tensile strength, the average specific strength, and the average stiffness of the twines of groups A and C are higher (in average) than the strengths of group B, however, the linear elongation of group B is higher (in average) than the linear elongation of groups A and C. In in-field tests, the twines of group B yielded 80% fewer failures in bale twining in comparison to the twines of groups A and C, of the same runnage.

Figure 5:
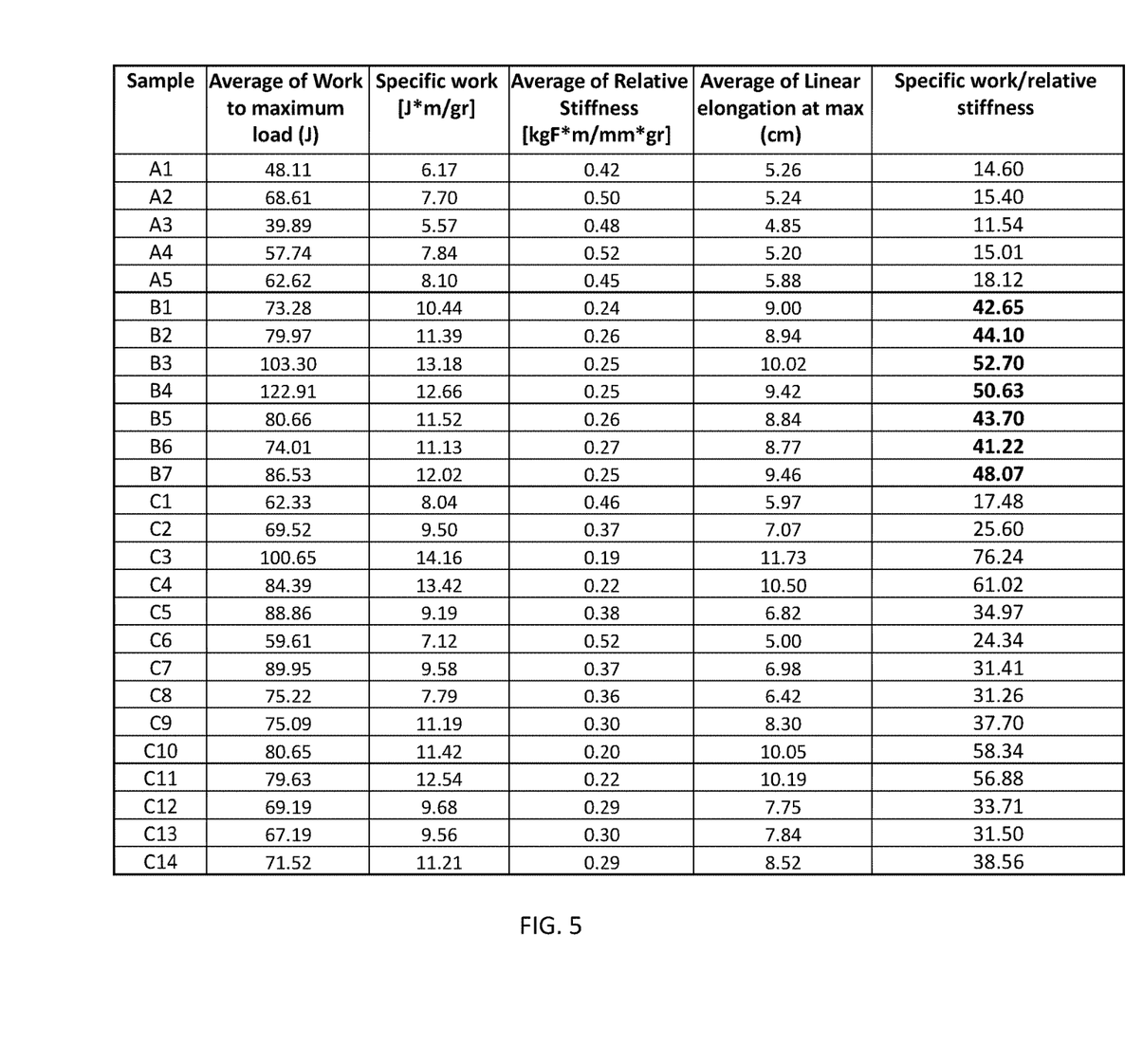
FIG. 5 is a table showing the ratio between specific work to a relative stiffness of commercial twins in comparison to twines according to embodiments of the invention.

Reference is now made to FIG. 5 which includes a table summarizing several properties of commercial twins in comparison to twines according to embodiments of the invention. The table of FIG. 5 includes the following properties which are the basis for calculating the ratio between the specific work to the relative stiffness for various groups of twines. The properties include the average work to maximum load [J], the specific work [J*m/gr], and the average of relative stiffness [KgF*m/mm*gr]. The specific work is defined as the ratio between an average work to maximum load [J], to an average weight of the runnage [g/m]. Groups A and C include commercial twines and group B includes twines according to some embodiments of the invention. As shown in the table, the ratio between the specific work to the relative stiffness of commercial twines is either higher than 55 [J/m] or lower than 40 [J/m]. Twines according to embodiment of the invention are characterized by a ratio between the specific work to the relative stiffness of between 40 [J/m] to 55 [J/m].

Therefore, twines according to embodiments of the invention showed a dramatic decrease of approximately 20% in the in-field failure for the same runnage. Additionally or alternatively, twines according to embodiments of the invention showed the same performance for an increased runnage (decreasing the twines diameter).

Unless explicitly stated, the method embodiments described herein are not constrained to a particular order in time or chronological sequence. Additionally, some of the described method elements may be skipped, or they may be repeated, during a sequence of operations of a method.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

What is claimed is:

1. A twine, comprising:
   a mixture of at least 95 wt. % polypropylene and at most 5 wt. % additives, wherein:
   (a) a crystalline phase of said twine is characterized by a degree of orientation of at most 0.9;
   (b) the twine is characterized by a ratio between a specific work to a relative stiffness, of between 30 to 45 [J*mm/KgF]; or
   (c) a combination of (a) and (b).

2. The twine of claim 1, wherein said crystalline phase of said twine is characterized by a degree of orientation of between 0.7 to 0.9.

3. The twine of claim 1, wherein said degree of orientation is measured using Polarized Fourier Transform Infrared Spectroscopy.

4. The twine according to claim 1, wherein said additives are selected from, impact modifier, polyethylene, pigment, and UV stabilizer.

5. The twine according to claim 1, characterized by a runnage of between 400 to 75 meter/per kg.

6. A bale with a twine, the twine comprising:
   a mixture of at least 95 wt. % polypropylene and at most 5 wt. % additives, wherein:
   (a) a crystalline phase of said twine is characterized by a degree of orientation of at most 0.9;
   (b) the twine is characterized by a ratio between a specific work to a relative stiffness, of between 30 to 45 [J*mm/KgF]; or
   (c) a combination of (a) and (b).

7. A method for intwining bales, comprising: twining a fibrous material using a twine to form a bale, the twine comprising:
   a mixture of at least 95 wt. % polypropylene and at most 5 wt. % additives, wherein:
   (a) a crystalline phase of said twine is characterized by a degree of orientation of at most 0.9;
   (b) the twine is characterized by a ratio between a specific work to a relative stiffness, of between 30 to 45 [J*mm/KgF]; or
   (c) a combination of (a) and (b).

8. The method of claim 7, further comprising providing a spool of the twine to a baler.

9. The method of claim 8, further comprising inserting said fibrous material into the baler.

* * * * *